(12) United States Patent
Johnsson

(10) Patent No.: US 6,396,836 B2
(45) Date of Patent: May 28, 2002

(54) ARRANGEMENT FOR ESTABLISHING CONNECTIONS THROUGH A NETWORK

(75) Inventor: Martin Johnsson, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/876,226

(22) Filed: Jun. 8, 2001

Related U.S. Application Data

(63) Continuation of application No. PCT/SE99/02261, filed on Dec. 3, 1999.

(30) Foreign Application Priority Data

Dec. 8, 1998 (SE) ................................................ 9804249

(51) Int. Cl.[7] ............................................. H04L 12/28
(52) U.S. Cl. ................................. 370/395.2; 370/395.64
(58) Field of Search ............................. 370/230, 232.4, 370/395.2, 395.21, 395.6, 395.64, 431, 458

(56) References Cited

U.S. PATENT DOCUMENTS

| | | | | |
|---|---|---|---|---|
| 5,373,504 A | * | 12/1994 | Tanaka et al. ............... | 370/248 |
| 5,487,065 A | | 1/1996 | Acampora et al. | |
| 5,513,178 A | * | 4/1996 | Tanaka ..................... | 370/395.3 |
| 5,764,961 A | * | 6/1998 | Bhat ........................... | 703/21 |
| 5,774,455 A | * | 6/1998 | Kawase et al. ............. | 370/232 |
| 5,898,673 A | * | 4/1999 | Riggan et al. .............. | 370/237 |
| 5,943,339 A | * | 8/1999 | Mauger ...................... | 370/352 |
| 5,949,791 A | * | 9/1999 | Byers et al. ................ | 370/352 |
| 5,970,064 A | * | 10/1999 | Clark et al. ................. | 370/242 |
| 6,317,438 B1 | * | 11/2001 | Trebes, Jr. ................... | 370/351 |

FOREIGN PATENT DOCUMENTS

| | | |
|---|---|---|
| GB | 2 324 435 A | 10/1998 |
| WO | 97/31495 | 8/1997 |

OTHER PUBLICATIONS

Mauger et al, "QoS Guarantees for Multimedia Services on a TDMA–Based Satellite Network", IEEE Communications Magazine, Jul. 1997, pp. 56–58.

Werner et al, "ATM–Based Routing in LEO/MEO Satellite Networks with Intersatellite Links", IEEE Journal on Selected Areas, vol. 15, No. 1, Jan. 1997, pp. 69–82.

* cited by examiner

*Primary Examiner*—David Vincent
(74) *Attorney, Agent, or Firm*—Nixon & Vanderhye, P.C.

(57) ABSTRACT

To ensure that appropriate resources are available in a network when AAL Type 2 connections are to be established, the network is divided into resource domains (RD_1, RD_2, RD_3, RD_4), and each resource domain is provided with a prediction connection admission control unit (p-CAC_1, p-CAC_2, p-CAC_3, p-CAC_4) which comprises information about available resources through its own resource domain as well as information about available resources for connections through the other resource domains of the network.

2 Claims, 1 Drawing Sheet

ARRANGEMENT FOR ESTABLISHING CONNECTIONS THROUGH A NETWORK

This application is a continuation of Ser. No. PCT/SE99/02261 filed Dec. 3, 1999.

TECHNICAL FIELD

The invention relates generally to an arrangement for establishing connections through a network based on AAL Type 2 technology and more specifically to predictive connection admission control in AAL Type 2 networks.

BACKGROUND OF THE INVENTION

"ITU-T I.363.2, B-ISDN AAL Type 2 Specification" defines and describes the function of AAL Type 2 which makes it possible to multiplex up to 256 different AAL Type 2 channels over one asynchronous transfer mode (ATM) connection.

To establish an end-to-end AAL Type 2 (AAL2) connection between two or more termination points, one or more AAL2 channels are cascaded. To relay the traffic from one AAL2 channel to another, relaying points are provided.

Resources have to be allocated in the network to assure that each individual end-to-end AAL2 connection, for each direction, is assigned a certain amount of bandwidth, and that a certain level of quality of service (QoS) can be guaranteed for that connection. Here, bandwidth means the number of bits per second that can be transmitted by a user of the connection, and QoS can be expressed in terms of end-to-end delay and delay variation, packet loss ratio, etc.

Thus, at the time when an AAL2 connection is established, the routing scheme in use must consider that appropriate resources are available to ensure that the network can guarantee the bandwidth and the QoS associated with the connection.

SUMMARY OF THE INVENTION

The object of the invention is to ensure that appropriate resources are available in a network when an AAL2 connection is established.

This is attained mainly in that the network is divided into resource domains, and that each resource domain is provided with a prediction connection admission control unit which comprises information about available resources for connection through its own resource domain as well as information about available resources for connections through the other resource domains of the network.

BRIEF DESCRIPTION OF THE DRAWING

The invention will be described more in detail below with reference to the appended drawing on which the single Figure schematically illustrates one embodiment of an arrangement according to the invention in a cellular network.

DESCRIPTION OF THE INVENTION

Figure 1:
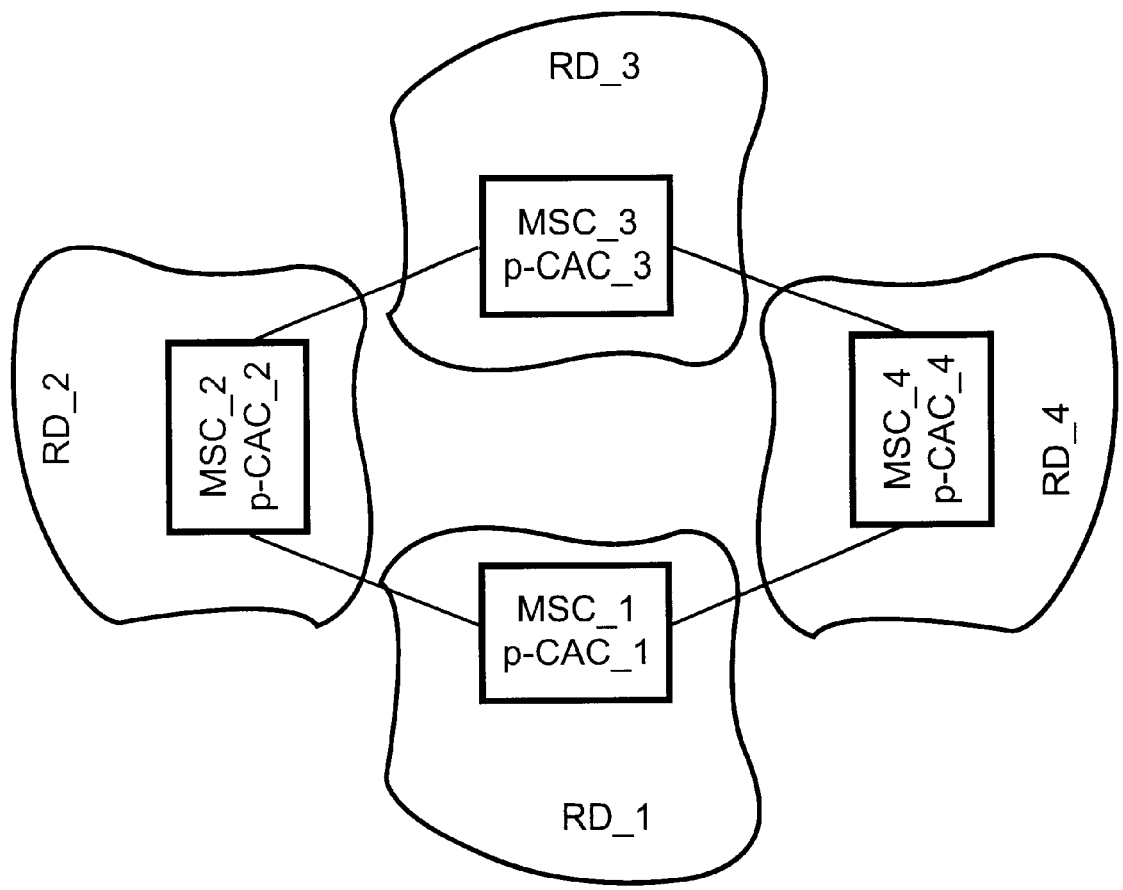

The invention will be described in connection with an embodiment of a cellular network in which AAL2 connections are used for transport of data which terminates in a radio base station (RBS), a base station controller (BSC) or possibly in a mobile switching center (MSC).

A routing scheme in the cellular network must ensure that requirements on bandwidth and QoS can be met for AAL2 connections.

In view hereof, the nodes in the network, i.e. RBSs, BSCs and MSCs in this case, must perform some kind of complex connection admission control (CAC) to validate that appropriate resources are available.

Since there are requirements on reducing overall complexity and costs for implementation of the RBSs and the BSCs, it would not be appropriate to allocate complex AAL2 connection management functions to these nodes in a cellular network.

In accordance with the invention, those functions, in a cellular network, are centralized in prediction connection admission control units (p-CACs) which can e.g. be located in or adjacent to the MSCs.

In accordance with the invention, the network is divided into resource domains (RDs) and p-CACs are provided in the RDs. Hereby, the problem of centralized AAL2 connection management is solved, specifically with respect to connection admission control (CAC) when applied to a cellular network.

Each p-CAC unit is adapted to decide whether or not there are available resources for establishment of an AAL2 connection that will terminate within or transit through its own RD, and predict the result of p-CACs controlling other RDs, if the connection has another point of termination or other points of termination located in those other resource domains. Thus, a p-CAC is specifically suited to assist in routing AAL2 connections which must meet certain requirements on bandwidth and QoS.

As indicated above, in accordance with the invention, a network, e.g. a cellular network, is divided into RDs as illustrated in the Figure.

In the embodiment shown, the network is divided into four resource domains RD_1, RD_2, RD_3, and RD_4 although the number of RDs can be greater or smaller in practice.

For reasons of clarity, in the cellular network schematically illustrated in the Figure, RBSs and BSCs have been omitted within each RD, so that only one node is shown within each RD, namely an MSC hosting a p-CAC. Thus, MSC_1, MSC_2, MSC_3 and MSC_4 host p-CAC_1, p-CAC_2, p-CAC_3 and p-CAC_4, respectively.

In accordance with the invention, each p-CAC has control over the resources for AAL2 connection establishment and release within its own RD. For dynamic exchange of aggregated/abstracted resource availability information, the different p-CACs can be interconnected. If there is no interconnection between the p-CACs, the resource availability in other RDs, as known by the respective p-CAC, is made available to the other p-CACs using alternative procedures, e.g. configured or distributed from a network management system.

It should also be pointed out that nodes without a p-CAC in the network, are not prohibited from performing some kind of CAC function, but not with the purpose of assisting in routing.

Also, it should be pointed out that the concept of p-CACs and RDs is not limited to be used only in cellular networks. Other networks and applications using AAL2 as a bearer service and having similar requirements on cost reduction in certain nodes and/or centralization of connection management, can use the same concept.

With reference to the Figure, an example will now be described as to how the p-CACs can be used during establishment of an end-to-end AAL2 connection through the network illustrated in the Figure.

In accordance with the invention, each p-CAC is adapted to provide information about resource availability regarding its own RD to the other p-CACs. This can be expressed in terms of number of new connections that can be established, limits on maximum delay and delay variation for reaching any destination located within the RD or for transiting the resource domain, limits on maximum packet loss ratio, and reachable addresses.

Assume that a request for an AAL2 connection to a destination in RD_3 is received by MSC_1 hosting p-CAC_1 in RD_1. Also assume that p-CAC_1 decides that appropriate resources are available to route the requested connection through its own RD, i.e. RD_1. By obtaining resource availability from the other p-CACs, p-CAC_1 then predicts that appropriate resources (in terms of meeting requirements on bandwidth and QoS) seem to be available in order to reach the destination which is located in RD_3 if the connection is routed through RD_2 rather than through R_4.

In this embodiment, p-CAC_1 produces a limited or abbreviated source route for the connection which at a minimum describes that the connection shall be routed via RD_2 and not via RD_4. MSC_1 will then forward the connection request to MSC_2.

Upon reception of the forwarded connection request by MSC_2 hosting p-CAC_2, p-CAC_2 ensures that appropriate resources are available whereupon MSC_2 forwards the connection request to MSC_3.

The forwarded connection request is received by MSC_3 hosting p-CAC_3. p-CAC_3 ensures that appropriate resources are available to reach the destination in RD_3. Then, MSC_3 will respond backwards in the connection request path, i.e. to MSC_2 in this case, that resources have been reserved for the connection.

MSC_2 receives the response from MSC_3, and responds in its turn backwards to MSC_1 that resources have been reserved for the connection.

MSC_1 receives the response from MSC_2 and the end-to-end AAL2 connection is established.

If a p-CAC along the chosen connection path decides that the requirements on bandwidth and QoS for a connection could not be met and/or if other resources not directly related to these requirements, are not available, that p-CAC will reject the connection request and initiate a response in the backwards direction informing about "unavailable resources".

Providing a p-CAC function in combination with dividing an AAL2 network into RDs, makes it possible to perform QoS-based routing and at the same time reduces complexity and costs for implementation of AAL2 technology in certain nodes in the network.

What is claimed is:

1. In a network based on AAL Type 2 technology, an arrangement for determining whether an AAL Type 2 connection can be established through nodes of the network, the network being divided into a predetermined number of resource domains (RD_1–RD_4), each comprising a predetermined number of the nodes (MSC_1–MSC_4) of the network, one (MSC_1–MSC_4) of the nodes in each resource domain (RD_1–RD_4) hosting a prediction connection admission control unit (p-CAC_1–p-CAC_4), comprising information about resources available for establishing AAL Type 2 connections through its own resource domain (RD_1–RD_4), and each prediction connection admission control unit (p-CAC_1–p-CAC_4), upon a request for an AAL Type 2 connection, being adapted to decide whether or not an AAL Type 2 connection can be established through its own resource domain, characterized in that each prediction connection admission control unit (p-CAC_1–p-CAC_4) comprises information about resources available for establishing AAL Type 2 connections through the other resource domains (RD_1–RD_4) of the network, and that each prediction connection admission control unit (p-CAC_1–p-CAC_4), upon a request for an AAL Type 2 connection, is adapted to predict, if the requested connection is to be extended to other resource domains, the outcome of decisions by said other prediction connection admission control units as to whether AAL Type 2 connections can be established through their resource domains.

2. The arrangement as claimed in claim 1, characterized in that each prediction connection admission control unit (p-CAC_1–p-CAC_4) is adapted, on the one hand, to advertise information about the available resources within its own resource domain (RD_1–RD_4) to the other prediction connection admission control units, and, on the other hand, to predict the outcome of said corresponding decisions by the other prediction connection admission control units (p-CAC_1–p-CAC_4) as to whether AAL Type 2 connections can be established through their resource domains, on the basis of the information about available resources advertised by said other prediction connection admission control units (p-CAC_1–p-CAC_4).

* * * * *